United States Patent [19]

Moteki

[11] Patent Number: 4,862,051
[45] Date of Patent: Aug. 29, 1989

[54] STEPPING MOTOR'S NEGATIVE-PHASE BRAKING CONTROL DEVICE

[75] Inventor: Eiji Moteki, Kawasaki, Japan

[73] Assignee: Fuji Electric Co., Ltd., Kanagawa, Japan

[21] Appl. No.: 158,679

[22] Filed: Feb. 22, 1988

[30] Foreign Application Priority Data

Mar. 18, 1987 [JP] Japan .................. 62-63594

[51] Int. Cl.$^4$ .............................................. H02P 8/00
[52] U.S. Cl. ................................... 318/696; 318/685
[58] Field of Search ................................ 318/696, 685

[56] References Cited

U.S. PATENT DOCUMENTS 3,328,658  6/1967  Thompson ...................... 318/696
3,345,547  10/1967  Dunne ........................... 318/696
4,683,408  7/1987  Inoue et al. ...................... 318/696
4,763,054  8/1988  Bundy ............................. 318/301

Primary Examiner—William M. Shoop, Jr.
Assistant Examiner—Saul M. Bergmann
Attorney, Agent, or Firm—Finnegan, Henderson, Farabow, Garrett & Dunner

[57] ABSTRACT

A negative-phase braking control device for accurately stopping a plural-phase stepping motor in a very short time. The negative-phase braking control is performed by comparing the present position signal value representing the position of a rotor of the motor with the signal values which the present position signal value should take at a target position and at a predetermined position before the target position and controlling the rotation of the motor in the forward and reverse directions in accordance with the result of the comparison.

8 Claims, 4 Drawing Sheets

FIG. 6
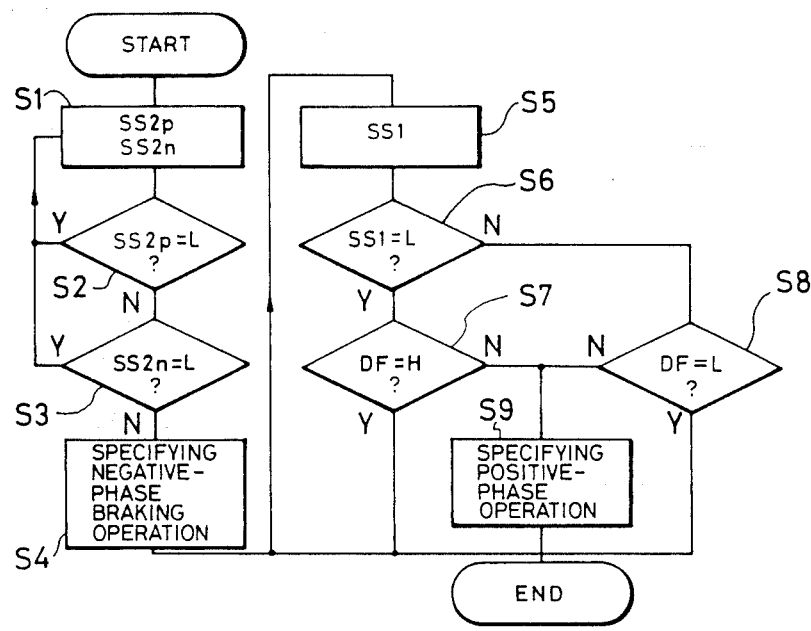
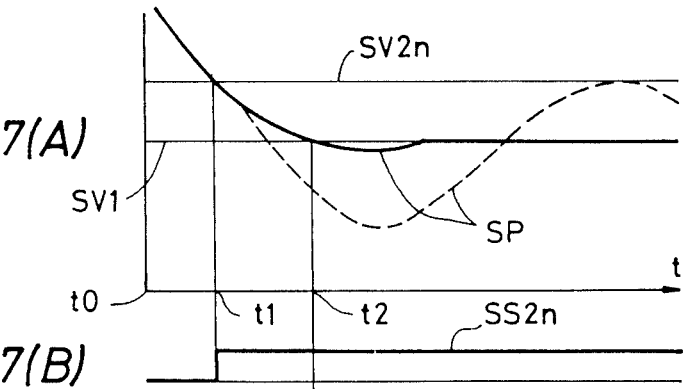
FIG. 7(A)
FIG. 7(B)
FIG. 7(C)

STEPPING MOTOR'S NEGATIVE-PHASE BRAKING CONTROL DEVICE

BACKGROUND OF THE INVENTION

This invention relates to a control device operated in braking a stepping motor to stop at a predetermined position its rotor or a unit mechanically coupled to the rotor.

In general, in the application of a stepping motor, it is necessary to quickly move the rotor or a unit coupled to the rotor to a target position and to accurately stop it there. For instance in the case where the writing and reading head of a stationary disk memory device is driven with a stepping motor, it is necessary for the head to quickly move to an aimed track to reduce the access time, and it is necessary for the head to accurately stop at the track to correctly write and read the data. Driving the stepping motor at high speed is, in general, not compatible with stopping it accurately; that is, it is not always simple to make the two operations compatible with each other. However, it should be noted that a stepping motor is generally of plural phase type, for instance two-phase type, and therefore, when a vector position defined by the phase currents of the two-phase coils is specified, the rotor can be accurately stopped at a predetermined angular position. That is, the rotor of the stepping motor has an angular position corresponding to a vector position defined by the phase currents, so that it is stably locked or held at the position. However, in stopping the rotor which is being rotated at high speed, even if the phase currents have specified a vector position corresponding to an angular position where the rotor should be stably stopped, the rotor oscillates over the position before stopping there; that is, it takes a relatively long period of time for the rotor to finally stop at the aimed position. The high speed rotation of the rotor loses its effect.

Accordingly, in stopping the rotor of the stepping motor which is being rotated at high speed, it is necessary to suitably brake the rotor thereby to prevent its oscillation over the aimed stop position. For this purpose, a negative-phase braking system has been well known in the art. In the system, after a vector position corresponding to the final stop position is specified for the stepping motor with the phase currents, a vector position preceding the above-described vector position by one step is specified so that the rotor of the stepping motor is subjected to negative-phase braking to reduce the speed of the rotor. Thereafter, the initial vector position is specified again so that the rotor is locked at the final stop position.

In the conventional negative-phase braking system, the period of time which elapses from the time instant that the final vector position is specified until the vector position for negative-phase braking is specified, and the period of time which elapses from the time instant that the vector position for negative-phase braking is specified as described above until the final vector position is specified again can be set independently of each other. When these periods of time are set to suitable values, the rotor of the stepping motor is locked at the aimed stop position without oscillation or with one or two oscillations. However, the system is still disadvantageous in the following points: The above-described periods of time are set to fixed values. Therefore, if the mechanical load of the stepping motor changes after setting the periods of time, then the rotor is braked insufficiently or excessively, so that an expected effect is not obtained. Furthermore, the system is considerably sensible to variation of the supply voltage for the stepping motor.

SUMMARY OF THE INVENTION

An object of this invention is to eliminate the above-described difficulties accompanying a conventional negative-phase braking system for a stepping motor. More specifically, an object of this invention is to provide a negative-phase braking control device for a stepping motor in which, even if operation conditions such as a mechanical load and supply voltage for the stepping motor change, the negative-phase braking is positively effected.

In this invention, the timing of subjecting the rotor to negative-phase braking and the timing of rotating the rotor in positive-phase again are controlled according to operating conditions of the stepping motor, for the purpose of eliminating the above-described difficulties accompanying the prior art. In order to obtain the above object, this invention provides a drive system of a stepping motor of plural phase type comprising: a drive circuit for supplying phase currents to the rotor of the motor to drive the rotor and to stop it at a predetermined position; drive instruction means for providing specifying signals for the drive circuit which specify a vector position defined by the phase currents; a position detecting circuit for detecting the present position of the rotor, to output a present position signal representing the position thus detected; signal value setting means for setting first and second signal values which the present position signal should take, respectively, at a target position where the rotor should be stopped and at a predetermined position before the target position; and signal value comparing means for comparing the present position signal value with the first and second signal values, to provide first and second state signals according to the results of comparison, so that when, after the drive instruction means applies specifying signals to the drive circuit which specify the target position, the rotor reaches the set position and the second state signal of the signal value comparing means change, the drive instruction means supplies specifying signals to the drive circuit which specify a vector position located before the target position, thereby to subject the rotor to negative-phase braking; and, when their rotor reaches the target position and the first state signal for the signal value comparing means changes in level, the drive instruction means supplies specifying signals to the drive circuit which specify a vector position corresponding to the target-position.

In the negative-phase braking control device, the drive instruction means preferably comprises a microprocessor similarly as in the case of the conventional stepping motor, and the signal value setting means and the signal value comparing means may be included in the microprocessor as the case may be. The position detecting circuit may be so designed that the present position of the rotor is detected directly by means of Hall elements or the like; however, it is preferable that the circuit is designed as follows: The counter electromotive force induced in the phase coils of the stepping motor in such a manner as to dynamically change with the change in angular position of the rotor is detected and differentiated to produce the present position signal representing the present position of the rotor. In this case, the present position of the rotor can be more accurately detected, and the timing of subjecting the rotor to negative phase braking and the timing of rotating the rotor in positive phase can be selected more effectively.

BRIEF DESCRIPTION OF THE DRAWINGS

FIG. 6 is a flow chart for a description of the operation of the drive instruction means in the device of FIG. 4; and FIGS. 7(A) to 7(C) are time charts showing the waveforms of essential signals in the device or the invention which occur in the operation of stopping the stepping motor in the direction opposite to the stopping direction of FIG. 3.

DETAILED DESCRIPTION OF THE INVENTION

The braking mechanism according to this invention will be described with reference to FIGS. 1 through 3.

Figure 1:
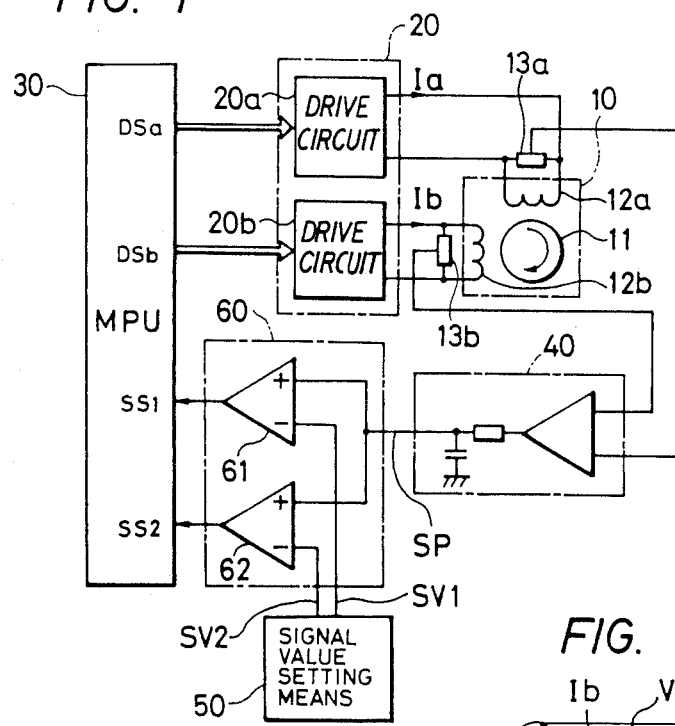
FIG. 1 is a block diagram for a description of the principle of a stepping motor's negative phase braking control device according to this invention.
Figure 2:
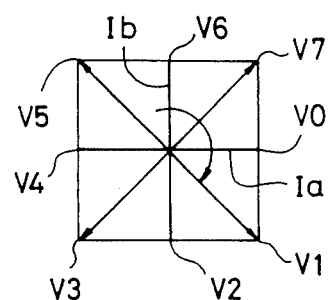
FIG. 2 is an explanatory diagram showing vectors formed by the phase currents of the stepping motor.

In FIG. 1, reference numeral 10 designates a two-phase stepping motor having a rotor 11 and two-phase coils 12a and 12b forming a stator thereof. Drive circuit means 20 comprises two drive circuits 20a and 20b which supply phase currents Ia and Ib to the phase coils 12a and 12b, respectively. The drive circuits 20a and 20b receive specifying signals DSa and DSb from drive instruction means 30 made up of a microprocessor. The specifying signals DSa and DSb comprise, for instance, 2-bit digital signals which can specify for the drive circuits 20a and 20b the positions of vectors which are defined by the phase currents Ia and Ib having positive, negative and zero flowing directions. FIG. 2 shows eight (8) vectors V0 to V7 which can be specified with the specifying signal as described above. As the vectors are specified successively clockwise (as indicated by the arrow) with the specifying signals, the rotor 11 of the stepping motor is turned clockwise. In this case, every other vector, for instance, only the odd numbered vectors may be specified.

In the device of the invention, a position detecting circuit 40 is adapted to detect the present position of the rotor 11 which is being rotated. In one of the means, the waveform of a counterelectromotive force induced in the phase coils 12a and 12b during the rotation of the rotor is utilized. Strictly stating, since the rotor magnetic flux crossing the phase coils represents the present position of the rotor and the counterelectromotive force waveform is its time differentiation waveform, a rotor's present position waveform can be provided by subjecting the counterelectromotive force to time-integral operation. In view of the above point, the position detecting circuit 40 according to this invention comprises a differential amplifier supplied with potentials at the middle points of resistors 13a and 13b which are respectively connected in parallel to the phase coils 12a and 12b, and R-C integrating circuit supplied with the output of the differential amplifier. In practice, as in an embodiment of the invention (described later), the integrating circuit may be replaced by a differentiating circuit. That is, a present position waveform obtained by the differentiating circuit is substantially equal to that obtained by the integrating circuit. FIG. 3 (A) shows the waveform of a present position signal value SP outputted from the position detecting circuit 40 in this manner. As is apparent from FIG. 3, the waveform is a damped oscillation waveform which converges to a certain value.

The present position signal value SP is applied to a signal value comparing means 60 comprising, for example, two comparators 61 and 62. The comparator 61 compares the present position signal value SP with a first signal value SVl outputted from a signal value setting means 50 to output a first state signal SSl representing the result of comparison. Similarly the comparator 62 compares the present position signal value SP with a second signal value VS2 provided by the signal value setting means 50 to produce a second state signal SS2. As shown in FIG. 3, the first signal value SV1 is set to a value to which the present position signal value SP converges; i.e, a value which the present position signal value SP should take at the target position where the rotor should be stopped, while the second signal value SV2 is set below the first signal value SV1; that is, it is set to a value which the present position signal value SP takes at a predetermined position located before the target position. The second signal value SV2 is to set the timing of starting the negative-phase braking operation of the rotor, and therefore is determined through experiment and experience so that the negative-phase braking of the rotor is most effectively carried out in accordance with the inertia of the rotor, that of a mechanical unit coupled thereto, the electrical characteristic of the stepping motor, and so on.

Figure 3:
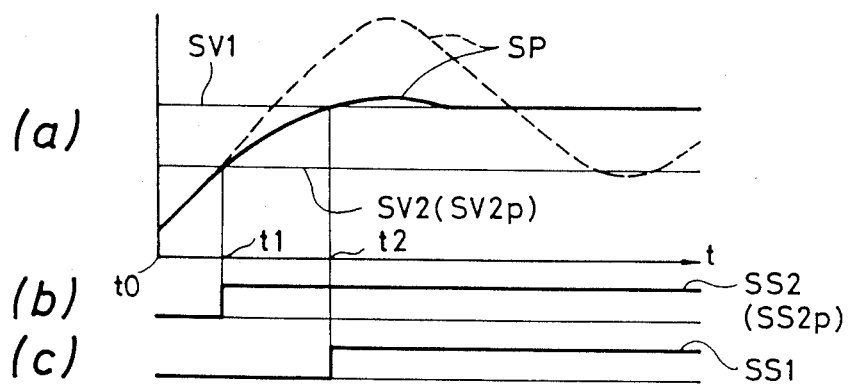
FIG. 3 is a time chart showing the waveforms of essential signals in the device of the invention.

When the drive instruction means 30 applies to the drive circuits 20a and 20b specifying signals DSa and DSb which specify a vector position to set the rotor 11 at the target position at the time instance as shown in FIG. 3 (A), the present position signal value SP outputted from the position detecting circuit 40 oscillates as indicated with the broken line, as was described above. When the present position signal value SP rises so as to be equal in level to the second signal value SV2 at the time instant t1, the level of the second state signal SS2 produced by the comparator 62 in the signal value comparing means 60 changes, for instance, from a low level (L) to a high level (H). In response to the level change, the drive instruction means 30 changes the values of the specifying signals DSa and DSb so that the negative-phase braking of the stepping motor 10 is effected. For convenience in description, it is assumed that the target position is the vector position V1 in FIG. 2, and at the previous time instant t0, the vector position V1 is selected instead of the vector position V7. In this case, at the time instant t1, the vector position V0 or V7 located before the target position is specified with the specifying signals; that is, the vector position is specified in the reverse direction with the specifying signals outputted from the drive instruction means. As a result, the stepping motor 10 is forcibly subjected to negative-phase braking, and the speed of the rotor is decreased. Therefore, on and after the time instant t1, the present position signal value SP has a waveform as indicated by the solid line which is different from the waveform as indicated by the dotted line.

At the time instant t2 when the present position signal value SP reaches the first signal value SV1 during the negative-phase braking operation, the rotor of the stepping motor reaches the target position, and at the same time the level of the first state signal SS1 provided by the comparator 61 in the signal value comparing means 60 is changed from a low level (L) to a high level (H) as shown in FIG. 3 (C). In response to this level change, the drive instruction means 30 changes the contents of the specifying signals DSa and DSb to select the vector position V1, namely, the target, position again. As a result, a locking force exerted on the rotor of the stepping motor to move it towards the target position. Thus, as shown in FIG. 3 (A), the rotor is locked at the target position in a relatively short period of time and is completely stopped.

As is apparent from the above description, if the difference between the second signal value SV2 for determining the start of the negative-phase braking operation and the first signal value SV1 for the target position is excessively small, then a high negative-phase braking effect cannot be expected. Therefore, it is preferable to determine the second signal value SV2 so that, as shown in FIG. 3 (A) the rotor passes slightly over the target position during the negative-phase braking operation. In the case where this condition cannot be satisfied merely by selecting the second signal value SV2 as described above, the vector position for the negative-phase braking operation can be selected in combination with the above-described method. If the operating conditions are determined in this manner, then the rotor of the stepping motor can be stopped at the target position within a considerably short period of time without overshooting.

In the negative-phase braking system of the invention, unlike the conventional one, the timing of starting the negative-phase braking operation is not determined from the lapse of time; that is, it is determined from the time instance when the present position signal value SP representing the actual motion of the rotor coincides with the second signal value SV2. This, compensating the effects of variable factors such as a mechanical load and supply voltage for the stepping motor, affords a suitable negative-phase brake in the stepping motor. Accordingly, the rotor can be stopped at the target position in a very short period of time.

Figure 4:
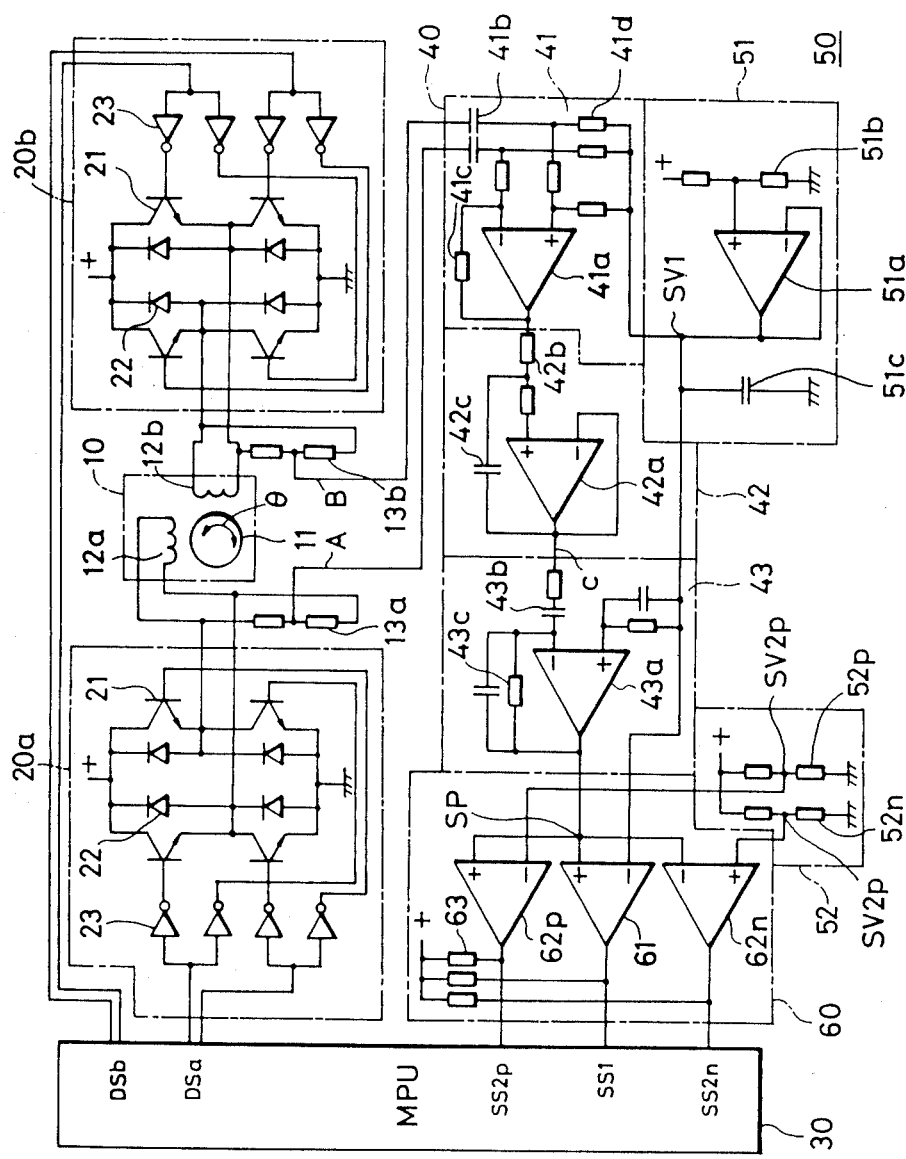
FIG. 4 is a circuit showing one example of the stepping motor's negative phase braking control device according to the invention.

FIG. 4 is a circuit diagram showing the negative-phase brake control device of a stepping motor according to this invention. FIG. 5 is a waveform diagram showing signals in the circuit of FIG. 4. FIG. 6 is a flow chart showing the operation of a microprocessor, namely, a drive instruction means 30 in the circuit of FIG. 4.

In this embodiment, a stepping motor 10 is rotatable in forward and reverse directions as indicated by the arrow in FIG. 4. In response to the directions of rotation of the stepping motor 10, signal value setting means 52 sets two second signal values SV2p and SV2n, while signal value comparing means 60 provides two second state signals SS2p and SS2n. In this embodiment, these means 52 and 60 are made up of hardware.

As shown in FIG. 4, drive circuits 20a and 20b are provided for two phase coils 12a and 12b of the two-phase stepping motor 10, respectively. These drive circuits 20a and 20b are equal in arrangement, each comprising four transistors 21, four freewheeling diodes 22, and four inverters 23. The drive instruction means (microprocessor) 30 applies specifying signals DSa and DSb that are 2-bit signals. The bit signals of these specifying signals DSa and DSb are applied to the bases of the bridge-connected. transistors 21, so that in each of the bridge circuits two transistors 21 located on diagonally opposite sides and the remaining transistors 21 on the other diagonally opposite sides are alternately rendered conductive (on) and non-conductive (off). Therefore, when the bits of the specifying signals DSa and DSb are alternately set to a low level (L), the drive circuits 20a and 20b supply positive- or negative-phase current to the phase coils 12a and 12b; and when the bits of the specifying signals DSa and DSb are raised to a high level (H), no phase current is supplied to the phase coils 20a and 20b. The drive instruction means 30 selects one of the combinations of the signal values of the specifying signals DSa and DSb as described above, to specify for the stepping motor 10 one of the eight vector positions V0 through V7 formed by the phase current as shown in FIG. 2.

Figure 5A:
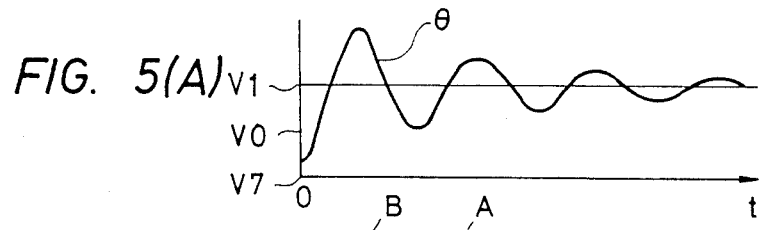
FIGS. 5(A) to 5(G) are time charts showing the waveforms of essential signals in the device shown in FIG. 4.
Figure 5B:
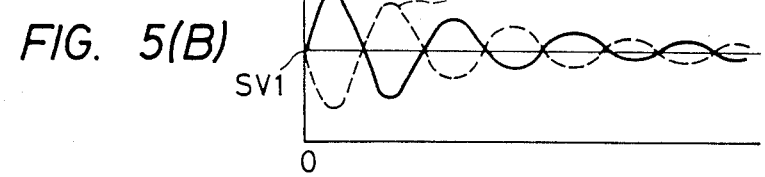
Figure 5C:
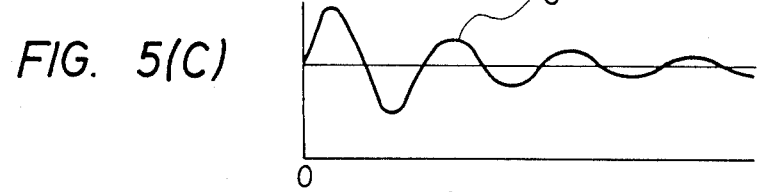
Figure 5D:
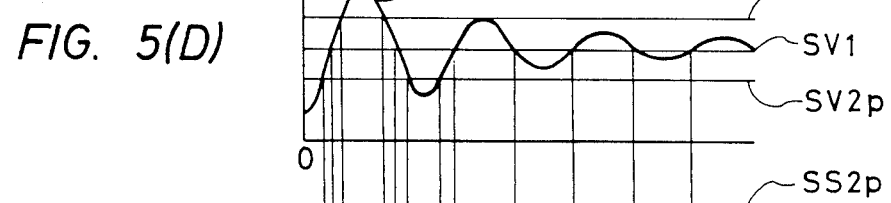
Figure 5E:
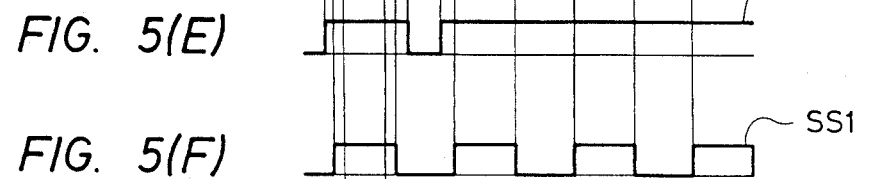
Figure 5F:
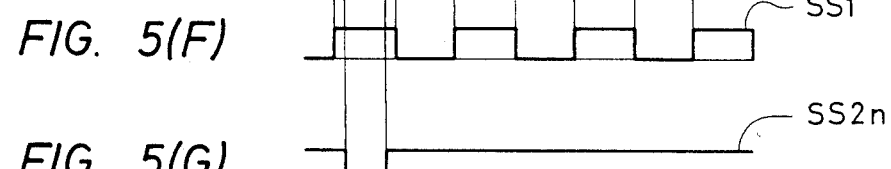
Figure 5G:
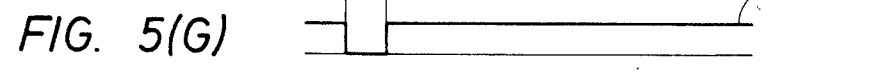

In the embodiment, a position detecting circuit 40 comprises an amplifier section 41, a filter section 42 and a differentiating circuit section 43 as indicated in the substantially central portion of FIG. 4. The first stage of the position detecting circuit 40, that is, the amplifier section 41 is a differential amplifier essentially comprising an operational amplifier 41a having the two input terminals which are supplied with voltages A and B at the connecting points of two pairs of resistors 13a and 13b parallelly connected to the phase coils 12a and 12b of the stepping motor 10 through capacitors 41b and 41b, respectively. When the stepping motor 10 is driven for instance from the vector position V7 in FIG. 2 towards the vector position V1 which is selected as the target position so that the angular position of the rotor 1 of the motor 10 converges to the target position with a damped oscillation as shown in FIG. 5 (A), the voltages A and B show counterelectromotive force waveforms as illustrated in FIG. 5(B). The waveforms are damped oscillation waveforms which are obtained by differentiating the waveform of the angular position, and are shifted by 180° from each other in phase.

In the embodiment, signal value setting means 50 comprises a first signal value setting circuit 51 for setting a first signal value SV1 and a second signal value setting circuit 52 for setting two signal values SV2p and SV2n. The voltages A and B are raised as much as the first signal value SV1 of first signal value setting circuit 51 with the aid of three resistors 41d as shown in FIG. 5 (B) so that bias voltage equal to the first signal value SV1 is applied to the amplifier section 41 in the position detecting circuit 40. However, the operation of the amplifier 41 is not greatly affected by the bias voltage; that is, the amplifier section 41 operates as a differential amplifier having a feedback resistor 41c, to apply the composition of the two waveforms A and B to the filter section 42. The filter section is a low-pass filter having a so-called "secondary characteristic" in which the threshold frequency is selected by means of a resistor 42b and a capacitor 42c. The filter section 42 operates to eliminate fine noise components from the composition of the waveforms A and B, thereby to output a composite signal C as shown in FIG. 5 (C). The above-described first signal value setting circuit 51 includes a voltage-follower-connected operational amplifier 51a and outputs the first signal value SV1 set by a pair of resistors 51b. The first signal value SV1 is stabilized by a capacitor 51C.

Biased as much as the first signal value SV1, the differentiating circuit section 43, the last stage of the position detecting circuit 40, differentiates the composite signal C with a time constant determined by a capacitor 43b and a resistor 43c, to output a present position signal SP as shown in FIG. 5 (D). As is apparent from comparison between FIGS. 5(A) and FIG. 5(D), the waveform of the present position signal SP substantially represents the waveform of the angular position of the rotor, and it is raised as much as the first signal value SV1. The differentiating circuit section 43 may be replaced by an integrating circuit.

The present position signal SP is applied to first input terminals of three comparators 61, 62p and 62n of the signal value comparing means 60. The above-described signal value SV1 is applied to the remaining input terminal of the comparator 61 adapted to provide a first state signal SS1, while second signal values SV2p and SV2n set by resistors 52p and 52n in the second signal value setting circuit 52 are applied to the remaining input terminals of the comparators 62p and 62n to produce second state signals SS2p and SS2n, respectively. The second signal value SV2p and the second state signal SS2p are to turn the rotor 11 in the positive direction, and the second signal value SV2n and the second state signal SS2n are to turn the rotor 11 in the negative direction. As shown in FIG. 5 (D), the second signal value SV2p is lower than the first signal value SV1, and the second signal value SV2n is higher than the first signal value SV1. Potential increasing resistors 63 are connected to the output terminals of the comparators 61, 62p and 62n so that the first state signal SS1 and the second state signals SS2p and SS2n, which are at the TTL level, are applied, in waveforms corresponding to comparison results, to the drive instruction means (microprocessor) 30.

The operation of the device will be described in conjunction with the operation of the drive instruction means 30 with reference to FIG. 6.

Immediately after specifying the vector position from the vector position V7 to the vector position V1 (the final target position) for the drive circuits 20a and 20b with the specifying signals DSa and DSb in the above-described manner, the drive instruction means 30 starts its operation shown in the flow chart of FIG. 6. In this connection, it is assumed that, in this case, the stepping motor 10 is being driven in the positive direction, and the drive instruction means 30 has stored the drive direction with the direction flag DF being at "H".

In the first step S1, the drive instruction means 30 reads the second state signals SS2p and SS2n outputted from the signal value comparing means 50, and then in the second step S2, it is determined whether or not the second state signal SS2p is at "L". At this time instant t0, the second state signal SS2P is at "L" as is apparent from FIG. 3 (B), and therefore step Sl is effected again. That is, this state is maintained unchanged until the present signal value SP representing the present position of the rotor 11 is raised to the second signal value SV2p as shown in FIG. 3 (A). When the present signal value SP reaches the second signal value SV2p at the time instant t1, the second signal value SS2p is raised to "H" as shown in FIG. 3 (B) and therefore step S3 is effected. In step S3, it is determined whether or not the second state signal SS2n read in step S1 is at "L". However, as is apparent from FIG. 5 (G), the second state signal SS2n is held at "H" from the beginning, and it is not set to "L" until the present position signal value SP reaches the second signal value SV2n higher than the first signal value SV1. Accordingly, at the time instant t1, the second state signal SS2n is at "H". As a result, the result of determination in step S3 is "NO", and step S4 is effected. In step S4, the drive instruction means 30 switches the specifying signals DSa and DSb to apply negative-phase braking to the stepping motor 10. More specifically, the specifying signals operate to return the rotor 11 to the vector position V7 located before the vector position corresponding to the target position, or to the vector position V1 closer to the target position as the case may be. As a result, the rotor 11 of the stepping motor is braked so that its speed is quickly decreased. On the other hand, in the drive instruction means 30, its operation is shifted from step S4 to step S5.

In step S5, the drive instruction means 30 reads the first state signal SS1, and in the next step S6, it is determined whether or not the signal SS1 is at "L". Immediately after the time instant t1 when the negative-phase braking operation was started, the present position signal SP is not sufficiently raised, and the first state signal SS1 is still at "L" as shown in FIG. 5 (F). Therefore, step S7 is effected. In this case, the direction flag DF is at "H", and therefore the operation is shifted from step S7 to step S5. That is, a loop is formed in which steps S5 through S7 are repeatedly carried out until the first state signal SS1 is raised to "H".

When, at the time instant t2 in FIG. 3, the rotor 11 reaches the target position and the first state signal SS1 is raised to "H", the operation of the drive instruction means 30 is shifted from step S6 to S8 leaving the loop. In step S8, it is determined whether or not the direction flag DF is at "L". In this case, the direction flag DF is at "H", and therefore step S9 is effected. In step S9, the drive instruction means 30 outputs the specifying signals DSa and DSb to specify the vector position V1 corresponding the target position for the drive circuit. That is, in step S9, the rotor in negative phase braking state is turned in the forward direction, so that a locking force is applied to the rotor 11 to stop it at the target position. Thus, the negative-phase brake control operation of the rotor being rotated in the positive direction has been accomplished.

Now, an operation of stopping at a target position the rotor which is rotated in the negative direction will be described. In this connection, it is assumed that the drive instruction means 30 has stored the negative rotation direction with the direction flag DF being at "L", and the rotor 11 is turned, for instance, from the vector position V1 in FIG. 2 to the vector position V7 which is the target position. FIG. 7 shows the waveforms of essential signals in the rotation of the rotor in the negative direction.

At the time instant t0 when the operation of FIG. 6 is started, as is apparent from FIG. 7 (A), the present position signal value SP is high; more specifically, it is higher than the second signal value SV2p which is lower than the first signal value SV1, and therefore the second state signal SS2p is at "H". Accordingly, the result of determination is "NO". Accordingly, the operation is shifted from the step 2 to the step 3. In this case, as is apparent from FIG. 7 (B), the second signal value SS2n is still at "L". Therefore, in step S3, the result of determination is "YES". Accordingly, the operation of the drive instruction means 30 is returned to step S1 from step S3. Thus, steps S1 through S3 is repeatedly carried out until the present position signal value SP becomes equal in level to the second signal value SV2n.

When, at the time instant t1, the present position signal value SP reaches the second signal value SV2n, and the second state signal SS2n is raised to "H", step S4 is effected. In step S4, the drive instruction means 30 outputs the specifying signals to specify, for instance, the vector V1 or V0 to subject the stepping motor to negative-phase braking thereby to decrease the speed of the rotor 11. During this control operation, step S5 is effected so that the drive instruction means 30 reads the first state signal SS1. In the next step S6, it is determined whether or not the signal SS1 is at "L". In this case, the state signal SS1, as shown in FIG. 7(C), is held at "H" even after the time instant t1. Therefore, step S8 is effected. In step S8, since the direction flag DF is at "L", the result of determination is "YES", and therefore step S5 is effected. Thus, a loop consisting of steps S5, S6 and S8 is formed, so that steps S5 through S8 are repeatedly carried out until the present position signal value SP decreases to reach the first signal value SV1. When the rotor 11 while being decelerated reaches the target position at the time instant t1 while the present position signal value SP becomes equal to the first signal value SV1, and the first signal SS1 is set to "L", then step S7 is effected. In this step, the direction flag DF is at "L", and therefore the operation is shifted to step S9. In step S9, the drive instruction means 30 provides the specifying signals DSa and DSb to specify the vector position V7, the target position, for the drive circuit. In response to this, the rotor is locked at the target position, and it is stopped a relatively short period of time after the time instant t2 as shown in FIG. 7(A).

While the invention has been described with reference to its preferred embodiment, the invention is not limited thereto or thereby; that is, it may be changed or modified in various manners. For instance, the position detecting circuit described above may be replaced by a circuit capable of providing a present position signal value which substantially correctly represents the present position of the rotor of the stepping motor or its waveform; that is, it can be formed by utilizing various conventional circuits or means in combination. In addition, it is not always necessary to use hardware to form the signal value setting means or the signal value comparing means; that is, it may be partly or in its entirety formed as software in the drive instruction means which is the microprocessor.

In the device according to the invention, unlike the conventional device in which only the positive phase locking force is applied to the rotor so that it is stopped while oscillating over the target position, the negative phase braking operation and the positive phase locking operation are employed in combination, so that the time required for the rotor to stop at the target position can be reduced to about one-tenth.

Further, in this invention, the timing of starting the negative phase braking operation is determined from the actual position of the rotor which is represented by the present position signal value outputted by the position detecting circuit, and the timing of performing the positive phase locking operation is also determined from the actual position of the rotor. Accordingly, in the negative phase braking control of the invention, when compared with the conventional one in which the timing of starting the negative phase braking operation and the timing of starting the positive phase locking operation are predetermined, the timing can be more suitably selected, and the time required for the rotor to stop at the target position can be reduced to substantially half. Still further, while in the conventional negative phase braking control the negative phase braking effect is reduced when operation conditions of the stepping motor such as a mechanical load and supply voltage change, in the negative phase braking control of the invention the above-described effects are positively obtained at all times.

What is claimed is

1. A negative phase breaking control device for a stepping motor, comprising:
    drive means for supplying phase currents to a plural-phase stepping motor including a rotor and a stator having plural-phase coils to drive said rotor and lock said rotor at a predetermined position;
    drive instruction means for producing specifying signals to specify for said drive means a vector position at which said rotor is to be stopped;
    position detecting means for detecting a present position of said rotor and providing a present position signal value representing said present position on the basis of oscillating counterelectromotive force waveforms induced in said phase coils of said stepping motor;
    signal value setting means for setting a first signal value and at least one of several second signal values which said present position signal value should take at a target position where said rotor should be stopped and at a predetermined position before said target position, respectively; and
    signal value comparing means for comparing said present position signal value with said first and second signal values and outputting first and second state signals representing the results of comparison, respectively, to said drive instruction means; in response to said first and second state signals, said drive instruction means being operated so as to actuate a negative-phase braking operation on said motor when said present position signal value reaches said at least one second signal value.

2. A device as claimed in claim 1, wherein after first and second state signals are supplied to said drive instruction means, said drive instruction means supplies to said drive means specifying signals for specifying a vector position located before said target position when said rotor reaches said vector position and said second state signal from said signal value comparing means changes in level.

3. A device as claimed in claim 2, wherein said drive instruction means supplies to said drive means specifying signals for specifying a vector position corresponding to said target position when said rotor reaches said target position and said first state signal changes in level.

4. A device as claimed in claim 1, wherein said drive instruction means comprises a microprocessor.

5. A device as claimed in claim 1, wherein said first state signal is supplied as a comparison input signal to said signal value comparing means together with said present position signal.

6. A device as claimed in claim 1, wherein said signal value setting means provides two second signal values respectively for the positive and negative directions of rotation of said stepping motor, and said signal value comparing means compares said two signal values thus provided with said present position signal value, to produce two second state signals, respectively.

7. A device as claimed in claim 1, wherein said position detecting means detects the present position of the rotor and provides said present position signal by differentiating said oscillating counterelectromotive force waveforms.

8. A device as claimed in claim 1, wherein said position detecting means detects the present position of the rotor and provides said present position signal by integrating said oscillating counterelectromotive force waveforms.

* * * * *